Patented Sept. 2, 1947

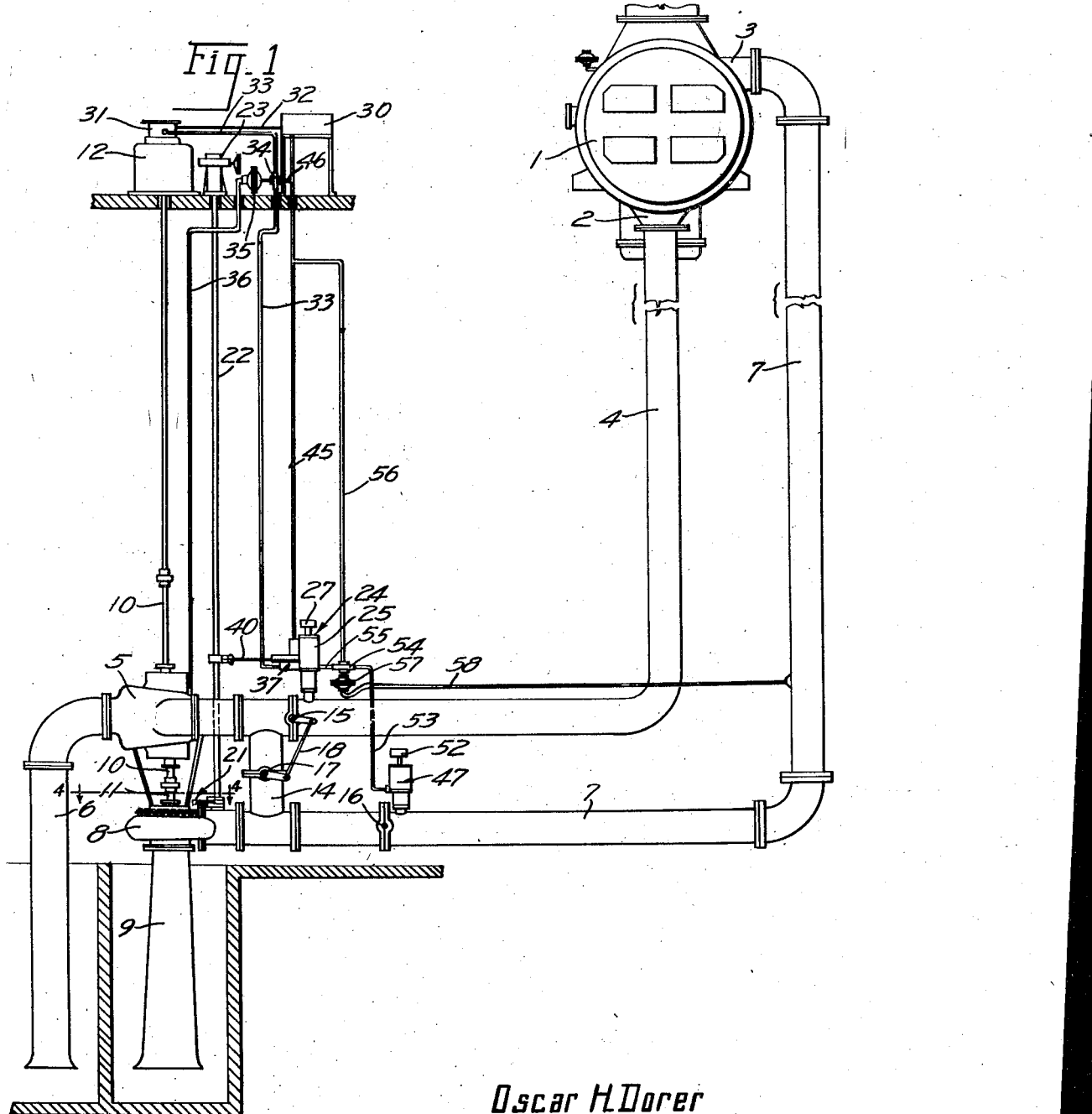

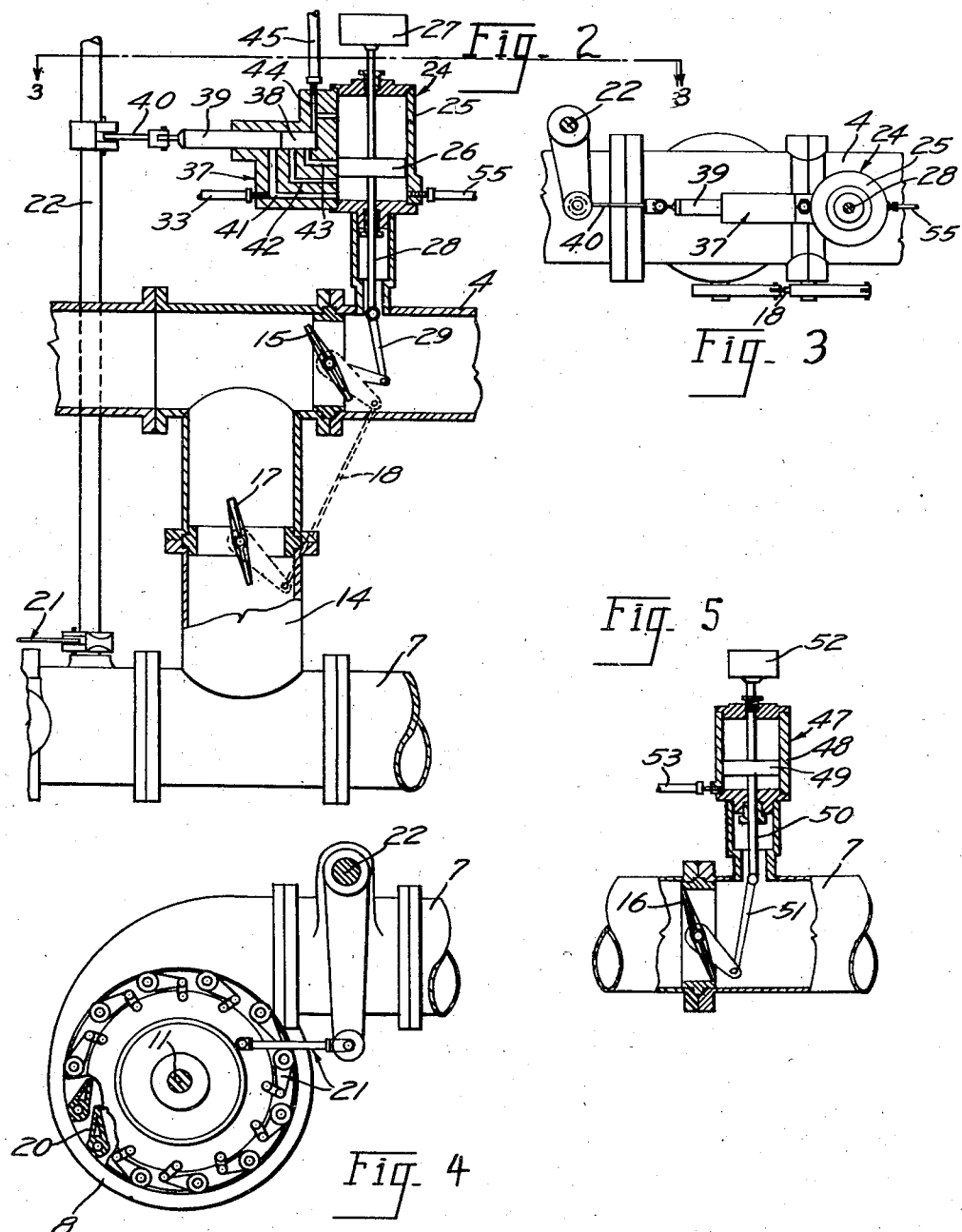

2,426,765

UNITED STATES PATENT OFFICE 2,426,765

POWER SYSTEM

Oscar H. Dorer, East Orange, N. J., assignor to Worthington Pump and Machinery Corporation, Harrison, N. J., a corporation of Delaware Substituted for abandoned application Serial No. 390,291, April 25, 1941. This application May 11, 1943, Serial No. 486,519

8 Claims. (Cl. 103—42)

This invention relates to power plants or systems, and more particularly to a cooling water circulating system for condensers, heat transfer or cooling devices employed in power plants.

This application is a substitute for abandoned application, Serial No. 390,291, filed April 25, 1941.

The invention is particularly adaptable for use in those power plants located in sections of the country where the available sources of cooling water are subject to wide variation in level, such as for instance, power plants depending upon rivers for their source of supply of cooling water, which rivers vary in level with the seasons and with variation in rainfall.

One such location of power plants is in the Ohio River valley, and Patents Nos. 1,769,671, issued July 1, 1930, to J. A. Bjerregaard, and 1,762,115, issued June 3, 1930, to H. P. Binder et al., refer to such installations and to conditions met with therein. The invention of these prior patents deals with the provision of economical circulation of cooling water in such power plants, which is also an object of the present invention. The present invention however, goes farther and is an improvement of the systems of these prior patents, providing, in combination with the pump, turbine and water conduits, a novel arrangement of valves which, instead of providing only ordinary static head, as provided by the water in the conduits or pipes, will build up pressure head on the turbine during the starting phase of the system, thus quickly bringing the power generated by the turbine into play and assisting in operation of the pump, with the consequent savings in power consumption as well as permitting the use of a smaller motor in connection with the pump and turbine with the resultant savings in the cost of the motor. Also, in the system of the present invention, all of the elements of the water circulating system will be more quickly brought into their normal operation during the starting phase of the system.

Another object of the present invention is to provide pressure actuated and controlled means for automatically operating the various valves in direct proportion to the pressures generated in the various water passages or conduits during the starting phase of the system, and to provide controls for the various pressure actuated means whereby the valves will be opened or closed proportionately to the flow of water through the conduits, the valves operating in synchronism with each other and with pressure variations in the system.

With these and other objects in view, as may appear from the accompanying specification, the invention consists of various features of construction and combination of parts, which will be first described in connection with the accompanying drawings, showing a power system of the preferred form embodying the invention, and the features forming the invention will be specifically pointed out in the claims.

In the drawings:

Figure 1 is a diagrammatic lay-out, in elevation, of the improved system.

Figure 2 is a view, partly in vertical section and partly in elevation, showing certain of the valves and their operating and control mechanism.

Figure 3 is a fragmentary top plan taken on the elevation indicated by the line 3—3 of Figure 2.

Figure 4 is a horizontal section taken on the line 4—4 of Figure 1 and having parts thereof broken away.

Figure 5 is a fragmentary vertical section through the valve which controls the return flow of water to the turbine inlet, together with its operating mechanism.

Referring more particularly to the drawings, I indicates a surface steam condenser, of any approved type such as is used in steam power plants for condensing the exhaust steam of the plant. These condensers, as is well known, utilize the circulation of cooling or condensing water therethrough for condensing the exhaust steam, and the condenser shown in Figure 1 of the drawings has a cooling water inlet 2 and outlet 3. The inlet 2 is connected by a conduit 4 to a circulating pump 5, of any suitable type, which picks up the cooling water from a suitable source through its inlet 6 and discharges it through the inlet conduit 4 into the cooling water circulating system of the condenser I. The cooling water leaves the cooling water circulating system of the condenser I through the outlet conduit 7, which opens into the inlet of a hydraulic turbine 8, of any suitable type, the discharge of which is through the discharge outlet 9.

Thus, in the operation of the system, the cooling water is forced or circulated by the pump 5 through the cooling water circulating system of the condenser I and returns to the hydraulic turbine 8, providing the motivating power for operating this turbine.

It is understood, of course, that the pump 5, being of any approved type of centrifugal pump, embodies an impeller (not shown) which is driven by the shaft 10. The shaft 10 is connected directly to the main shaft 11 of the hydraulic turbine 8 so that the turbine will serve as a driving medium for the pump 5 and thus the power or pressure of the water discharged from the water circulating system of the condenser 1 will be utilized for operating the pump 5. An electric motor 12, or other suitable prime mover, is connected directly to the pump shaft 10 for assisting in the operation of the pump 5 and to make up the hydraulic losses occasioned in the operation of the system.

It is to be understood that in power plants of this type the condenser 1 is placed at a high elevation; that is, above the flood level of the river serving as the source of supply for the cooling water, while the pump 5 and the turbine 8 are placed in a pit sufficiently deep to bring the suction of the pump into operative connection with the level of the cooling water supply source in its lowest stages.

A by-pass 14 is provided between the inlet conduit 4 and the outlet conduit 7, so as to permit the by-passing of water from the discharge of the pump 5 directly to the inlet of the turbine 8, without the water passing through the cooling water circulating system of the condenser 1, permitting the effective operation of the turbine in a comparatively short time after the unit is started up and providing and building up a pressure head on the turbine during the starting-up phase of operation of the system, thereby permitting quick utilization of the power generating capabilities of the turbine for operating the pump and relieving the motor 12 of the high starting load otherwise placed thereon at the starting up of operation of the system until the circulation of the cooling water was complete. This will also permit the utilization of a smaller, lower powered motor 12 than would otherwise be possible.

The creation of the pressure head on the turbine 8 is provided through the by-pass 14, in lieu of the usual static head which would be provided therefor by the quantity of water in the pipe 7, by valves 15 and 16. The valve 15 is placed in the inlet conduit 4, while the valve 16 is placed in the outlet conduit 7. Both of these valves are placed between the condenser and the by-pass 14 so that when starting up the unit these valves may be closed, completely isolating or by-passing the entire water flow from the pump 5 directly to the turbine 8. A valve 17 is placed in the by-pass 14, and this valve 17 is connected by suitable linkage, indicated at 18, to the valve 15, for synchronous operation therewith, so that as the valve 15 is opened, the valve 17 will be closed, in direct proportion to the degree of opening of the valve 15, and vice versa.

The turbine 8 is of the usual approved construction of hydraulic turbine, having wickets or gates 20, which are adjustable to permit and regulate the flow of water through the system by regulating the flow of water through the turbine. These wickets 20 are adjusted by any suitable type of adjusting means, indicated at 21, through the rotation of an adjusting rod 22.

The rod 22 is manually rotated, by suitable rotating means 23, placed at the high level, namely, at the elevation of the motor 12.

Pressure actuated means are provided for operating the various valves and the pressure actuating means for operating the valves 15 and 17, indicated at 24, are shown in detail section in Figure 2 of the drawings, comprising a cylinder 25, in which a piston 26 reciprocates. The piston 26 may be tensioned by a suitable weight 27. The piston 26 is connected to the valve 15 by means of a piston rod 28 and suitable appropriate linkage 29.

Pressure fluid for operating the piston 26 is provided from a suitable storage reservoir 30, while the pressure of the pressure fluid is provided by a pump 31, of any approved type, which is preferably operated directly from the motor 12.

A suction conduit 32 leads from the reservoir 30 to the pump 31, and the pressure fluid flows from the pump 31 through a conduit 33 leading to a two-way interrupter valve 34, of any approved construction, which may be purchased upon the open market. The valve 34 is operated by a pressure-actuated mechanism 35, of any approved construction, which may be purchased upon the open market, through a suitable conduit 36 having communication with both the pump 5 and the pressure-actuated mechanism 35.

The valve 34 is interposed in the conduit 33, which conduit leads to a distributing chamber 37 forming a part of the valve operating means 24 (see Figure 2). The chamber 37 is provided with a bore or chamber 38 containing a slidable plunger valve 39, which is connected by suitable linkage 40 to the wicket adjusting rod 22. The pressure fluid flows, in one position of the valve 34, into the distributing chamber 37 for actuating the piston 26, and the degree of movement of the piston 26, and consequently the degree of opening of the valve 15 and closing of the valve 17, is controlled by the position of the plunger valve 39 in the bore 38. Since the plunger valve 39 is operatively connected with the wicket adjusting rod 22, the valve 15 will be opened, and the valve 17 will be closed, in proportion to the water flow through the system, as regulated by the adjustment of the wickets 20.

The distributing chamber 37 is provided with passages 41, 42, and 43 which respectively place the cylinder 25 in communication with the bore 38. However, the passages 41, 42, and 43 are so arranged with respect to their communication with the bore 38 that the passages may be successively covered or uncovered by the plunger valve 39, depending upon the direction of movement of the plunger valve in the bore. The passages 41, 42, and 43 communicate with the cylinder 25 at points spaced longitudinally of the cylinder, the passage 41 being lowermost and opens into the cylinder below the piston 26. The conduit 33 communicates with the passage 41, while an outlet passage 44 places the bore 38 in communication with a return conduit 45 leading to the reservoir 30.

A bypass conduit 46 leads from the valve 34 to the conduit 45. Pressure fluid is pumped to the distributing chamber 37 only when the pump 5 develops sufficient pressure to actuate the mechanism 35 and adjust the valve 34 to deliver the pressure fluid to the distributing chamber. In the absence of such pump pressure, the valve 34 remains so conditioned as to pass the pressure fluid to the conduit 46 and back to the reservoir 30.

With the plunger valve 38 in the position of Figure 2, the pressure fluid will enter the cylinder 25 and move the piston 26 upwardly until the piston passes the port of communication between the cylinder 25 and the passage 42. When the piston moves to this position, the pressure fluid flows through the passage 42 and back to the reservoir 30, thus arresting movement of the piston and holding the valves 15 and 17 in partially opened and closed positions, respectively. If the plunger valve 38 is moved inwardly, so as to close the passage 42, then the piston 26 will move upwardly to a position which permits the pressure fluid to flow from the cylinder 25 back to the reservoir through the passage 43, and consequently permitting full opening of the valve 15 and full closing of the valve 17. Obviously, the chamber 37 may be provided with any number of passages in addition to those illustrated at 41, 42, and 43, to provide various increments of opening of the valve 15.

When the flow of pressure fluid to the pressure actuated mechanism 24 is cut off by the valve 34, the weight 27 will act to move the piston 26 downwardly, and close the valve 15 and open the valve 17. It is to be understood that the pressure of the pressure fluid flowing through the cylinder 25 below the piston 26 and either of the passages, 42 or 43 is sufficient to counteract the weight of the member 27 and hold the valve 15 in its degree of opening determined by the respective passages, 42 or 43, so long as the valve 34 is so conditioned by pump pressure effective on the pressure-actuated mechanism as to cause the pressure fluid to flow to the distributing chamber 37.

A pressure actuated mechanism 47 is provided for operating the valve 16 in the discharge or outlet conduit 7. This pressure actuated mechanism comprises a cylinder 48 (see Figure 5) having a piston 49 slidable therein. A piston rod 50 connects the piston 49 with a suitable linkage 51 connected with the valve 16. A weight 52 is provided for moving the piston 49 downwardly for closing the valve 16.

A pipe 53 leads from the cylinder 48 to a two-way interrupter valve 54 of any approved type purchasable upon the open market. A pressure pipe 55 leads from the cylinder 25 to the valve 54, and a bypass pipe 56 leads from the valve 54 to the pipe 45. The valve 54 is operated by a suitable pressure-actuated means 57, which may be of any approved type purchasable upon the open market. A pressure pipe 58 communicates with the outlet conduit 7 and leads to the mechanism 57. The mechanism 57 responds to predetermined pressure of the return circulating water in the conduit 7 for opening the valve 54 to pass pressure fluid to the cylinder 48. The pressure fluid entering the cylinder 48 causes the piston 49 to rise therein and move the valve 16 to its full opened position.

In starting the system, the valve 15 is open in a slight degree, the valve 17 is fully open, and the valve 16 is fully closed. Thus most of the pump outlet flows directly to the turbine 8. A pressure head is developed to act on the turbine 8 immediately, and the conduit 4 and the condenser 1 may be filled slowly.

When a predetermined pump pressure has been developed to act on the mechanism 35, the valve 34 is operated to pass pressure fluid to the distributing chamber 37. Adjustment of the shifter adjusting rod 22 controls the degree of opening and closing of the valves 15 and 17, respectively, as by first adjusting the plunger valve 39 to cover the passage 41. When the conduits 4 and 7 are filled, pressure is developed in the conduit 7, which pressure acts on the mechanism 57 to cause opening of the valve 54 and the delivery of pressure fluid to the cylinder 47, thus moving the valve 16 to its full open position. The wicket adjusting rod 22 may now be rotated to its full turbine 8 opening position, which causes the valve 15 to move to its full open position, with the valve 17 moving to its full closed position. Thus the valve 16 will be operated with the valves 15 and 17, and it will be closed when the valve 15 is closed and the valve 17 opened. Due to the fact that the pressure-actuated valve 54 controls the delivery of the pressure actuating fluid to the mechanism 47, the valve 16 will be held closed during the initial opening of the valve 15, until the pressure of the returning circulating water in the outlet conduit 7 reaches a predetermined degree sufficient to actuate the mechanism 57, at which time the valve 54 will be actuated to cause pressure fluid to pass into the cylinder 48 for moving the valve 16 to its full open position. Before pressure fluid is admitted to the cylinder 48, the valve 16 is maintained in a closed position by the gravity action of the weight 52, and pressure fluid flowing through the pressure pipe 55 is passed to the conduit 56 by the valve 54.

The mechanism 35 performs a protective function, since the valve 34 is opened thereby only when the pump 5 is primed and ready to deliver water, with the valves 15 and 16 remaining closed. The pressure fluid from the pump 31 continues to flow directly to the reservoir 30 until the mechanism 35 is subjected to predetermined pump pressure.

The mechanism 57 also performs a protective function, in that failure to attain sufficient pressure in the conduit 7 prevents opening of the valve 16. This valve opens only when predetermined pressure has been developed in the conduit 7. With the valve 16 closed, water flowing through the bypass 14 is prevented from flowing into the conduit 7 so that all the water flowing through the bypass is caused to pass to the turbine 8 to develop an effective pressure head.

It will be understood that the invention is not to be limited to the specific construction or arrangement of parts shown, but that they may be widely modified within the invention defined by the claims.

What is claimed is:

1. In a power plant, the combination of a circuit for circulated water, a pump including an impeller in said circuit for circulating the water, a turbine in said circuit, said pump impeller being connected to said turbine for operation thereby, a motor connected to said pump and turbine for supplying the hydraulic losses in said circuit, said circuit having an inlet conduit connected with the discharge of the pump and an outlet conduit connected with the inlet of the turbine, a by-pass conduit short circuiting the discharge of the pump direct to the inlet of the turbine, a valve in said inlet conduit, a valve in said outlet conduit, a valve in said by-pass, means connecting said by-pass valve and said inlet conduit valve for synchronous operation, pressure actuated means for operating the valve in the outlet conduit, said pressure actuated means being controlled by the pressure of water in the outlet conduit, adjustable means for predetermining the flow of water through the circuit, and pressure actuated means controlled by adjustment of said water flow predetermining means for operating said by-pass valve and said inlet conduit valve.

2. In a power plant, the combination of a circuit for circulated water, a pump including an impeller in said circuit for circulating the water, a turbine in said circuit, said pump impeller being connected to said turbine for operation thereby, a motor connected to said pump and turbine for supplying the hydraulic losses in said circuit, said circuit having an inlet conduit connected with the discharge of the pump and an outlet conduit connected with the inlet of the turbine, a by-pass conduit short circuiting the discharge of the pump direct to the inlet of the turbine, a valve in said inlet conduit, a valve in said by-pass, means connecting said by-pass valve and said inlet conduit valve for synchronous operation, adjustable means for predetermining the flow of water through the circuit, fluid pressure actuated means controlled by adjustment of said water flow predetermining means for operating said valves, and pressure actuated means operated by pressure within the pump for controlling the flow of actuating pressure fluid to said fluid pressure actuated means.

3. In a power plant, the combination of a circuit for circulated water, a pump including an impeller in said circuit for circulating the water, a turbine in said circuit, said pump impeller being connected to said turbine for operation thereby, a motor connected to said pump and turbine for supplying the hydraulic losses in said circuit, said circuit having an inlet conduit connected with the discharge of the pump and an outlet conduit connected with the inlet of the turbine, a by-pass conduit short circuiting the discharge of the pump direct to the inlet of the turbine, a valve in said inlet conduit, adjustable means for predetermining the flow of water through the circuit, means for operating said valve, means connecting said valve operating means and said water flow predetermining means for controlling operation of the valve to operate the valve proportionately to the water flow.

4. In a power plant, the combination of a circuit for circulated water, a pump including an impeller in said circuit for circulating the water, a turbine in said circuit, said pump impeller being connected to said turbine for operation thereby, a motor connected to said pump and turbine for supplying the hydraulic losses in said circuit, said support having an inlet conduit connected with the discharge of the pump and an outlet conduit connected with the inlet of the turbine, a by-pass conduit short circuiting the discharge of the pump direct to the inlet of the turbine, a valve in said inlet conduit, adjustable means for predetermining the flow of water through the circuit, means for operating said valve, means connecting said valve operating means and said water flow predetermining means for controlling operation of the valve to operate the valve proportionately to the water flow, and means actuated by pressure within the pump for controlling operation of said valve operating means.

5. In a power plant, the combination of a circuit for water, a pump including an impeller in said circuit for circulating the cooling water, a turbine in said circuit, said pump impeller being connected to said turbine for operation thereby, a motor connected to said pump and turbine for supplying the hydraulic losses in said circuit, pressure actuated means operable to permit by-pass of water from the pump discharge direct to the turbine inlet, said turbine having wickets adjustable to predetermine the flow of water through the circuit, means for controlling operation of said pressure actuated means, means for adjusting said wickets, and means connected to said control means for regulating operation of the pressure actuated means in accordance with adjustment of said wickets.

6. In a power plant, the combination of a circuit for circulated water, a pump in said circuit for circulating the water, a motor for driving said pump, a turbine operatively connected with said pump to aid the motor in driving the pump, said circuit including an inlet conduit connected with the discharge of said pump and an outlet conduit discharging water into the inlet of said turbine, a by-pass connecting said pump with said turbine, a first valve in said inlet conduit for controlling the flow of water therein, a second valve in said by-pass for controlling the flow of water from said pump to said turbine, a first operating connection between said first and second valves for adjusting the valves synchronously but reversely with respect to each other, a fluid circuit operatively connected with said first operating connection for actuating said first and second valves, means responsive to predetermined pump pressure for controlling the operation of said fluid circuit, a third valve for said outlet conduit for controlling the admission of water to said turbine, a second operating connection between said fluid circuit and said third valve, and means responsive to predetermined pressure in said outlet conduit for controlling the operation of said fluid circuit with respect to said second operating connection.

7. In a power plant, the combination of a circuit for circulated water, a pump in said circuit for circulating the cooling water, a motor for driving said pump, a turbine operatively connected with said pump to aid the motor in driving the pump, said circuit including an inlet conduit connected with the discharge of said pump and an outlet conduit discharging water into the inlet of said turbine, a by-pass connecting said pump with said turbine, a first valve in said inlet conduit for controlling the flow of water therein, a second valve in said by-pass for controlling the flow of water from said pump to said turbine, a first operating connection between said first and second valves for adjusting the valves synchronously but reversely with respect to each other, a fluid circuit operatively connected with said first operating connection for actuating said first and second valves, means responsive to predetermined pump pressure for controlling the operation of said fluid circuit, a third valve for said outlet conduit for controlling the admission of water to said turbine, a second operating connection between said fluid circuit and said third valve, means responsive to predetermined pressure in said outlet conduit for controlling the operation of said fluid circuit with respect to said second operating connection, and a fluid circuit control for regulating the operation of the fluid circuit with respect to said first operating connection to selectively position said first and second valves.

8. In a power plant, the combination of a circuit for circulated water, a pump in said circuit for circulating the water, a motor for driving said pump, a turbine operatively connected with said pump to aid the motor in driving the pump, said circuit including an inlet conduit connected with the discharge of said pump and an outlet conduit discharging water into the inlet of said turbine, a by-pass connecting said pump with said turbine, a first valve in said inlet conduit for controlling the flow of water therein, a second valve in said by-pass for controlling the flow of water from said pump to said turbine, a first operating connection between said first and second valves for adjusting the valves synchronously but reversely with respect to each other, a fluid circuit operatively connected with said first operating connection for actuating said first and second valves, means responsive to predetermined pump pressure for controlling the operation of said fluid circuit, a third valve for said outlet conduit for controlling the admission of water to said turbine, a second operating connection between said fluid circuit and said third valve, means responsive to predetermined pressure in said outlet conduit for controlling the operation of said fluid circuit with respect to said second operating connection, said turbine having gates, and a fluid circuit control for regulating the operation of the fluid circuit with respect to said first operating connection to selectively position said first and second valves, said fluid circuit control being operatively connected with said gates for adjusting the gates in accordance with predetermined adjustment of said first and second valves.

OSCAR H. DORER.

REFERENCES CITED

The following references are of record in the file of this patent:

UNITED STATES PATENTS

| Number | Name | Date |
|---|---|---|
| 1,762,115 | Binder et al. | June 3, 1930 |
| 1,769,671 | Bjerregaard | July 1, 1930 |
| 1,706,808 | Wye et al. | Mar. 26, 1929 |
| 1,934,631 | Taylor | Nov. 7, 1933 |
| 459,384 | Heermans | Sept. 8, 1891 |
| 473,949 | McGowan | May 3, 1892 |
| 995,057 | Cowles | June 13, 1911 |
| 2,080,288 | McCormack | May 11, 1937 |